(12) United States Patent
Hirai et al.

(10) Patent No.: US 9,116,012 B2
(45) Date of Patent: Aug. 25, 2015

(54) ON-VEHICLE APPARATUS

(75) Inventors: Kana Hirai, Kobe (JP); Shigehiko Miura, Kobe (JP); Shigehiko Kagotani, Kobe (JP); Teru Sawada, Kobe (JP); Yukisuke Ozaki, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 154 days.

(21) Appl. No.: 13/285,640

(22) Filed: Oct. 31, 2011

(65) Prior Publication Data

US 2012/0143503 A1 Jun. 7, 2012

(30) Foreign Application Priority Data

Dec. 6, 2010 (JP) ................................. 2010-272052

(51) Int. Cl.
*G01C 21/36* (2006.01)

(52) U.S. Cl.
CPC .......... *G01C 21/3688* (2013.01); *G01C 21/362* (2013.01)

(58) Field of Classification Search
CPC .......................... G01C 21/362; G01C 21/3688
USPC .......... 709/217; 701/444, 451, 491, 526, 527, 701/532, 541
See application file for complete search history.

(56) References Cited

U.S. PATENT DOCUMENTS

| | | | | |
|---|---|---|---|---|
| 6,121,900 | A * | 9/2000 | Takishita ................. | 340/995.11 |
| 6,766,246 | B2 * | 7/2004 | Mutoh .......................... | 701/454 |
| 6,839,630 | B2 * | 1/2005 | Sakamoto ..................... | 701/428 |
| 6,904,360 | B2 * | 6/2005 | Pechatnikov et al. ......... | 701/532 |
| 6,996,468 | B2 * | 2/2006 | Kohno et al. ................. | 701/454 |
| 7,818,125 | B2 * | 10/2010 | Hatano et al. ................ | 701/455 |
| 7,957,748 | B2 * | 6/2011 | Heater et al. ............... | 455/456.1 |
| 8,121,640 | B2 * | 2/2012 | Russ et al. ................. | 455/556.1 |
| 8,447,598 | B2 * | 5/2013 | Chutorash et al. ............ | 704/231 |
| 2002/0091486 | A1 * | 7/2002 | Hubschneider et al. ...... | 701/209 |
| 2002/0143466 | A1 * | 10/2002 | Mutoh ......................... | 701/207 |
| 2002/0173908 | A1 * | 11/2002 | Sakamoto ..................... | 701/211 |
| 2003/0156097 | A1 * | 8/2003 | Kakihara et al. ............. | 345/156 |
| 2004/0160342 | A1 * | 8/2004 | Curley et al. ............. | 340/995.1 |
| 2005/0027440 | A1 * | 2/2005 | Sakamoto ..................... | 701/200 |
| 2005/0027441 | A1 * | 2/2005 | Sakamoto ..................... | 701/200 |
| 2007/0203646 | A1 * | 8/2007 | Diaz et al. .................... | 701/213 |
| 2008/0077324 | A1 * | 3/2008 | Hatano et al. ................. | 701/212 |
| 2008/0147321 | A1 * | 6/2008 | Howard et al. ............... | 701/211 |
| 2009/0104919 | A1 * | 4/2009 | Heater et al. ............... | 455/456.1 |
| 2009/0315913 | A1 * | 12/2009 | Nagashima et al. .......... | 345/629 |
| 2010/0220250 | A1 * | 9/2010 | Vanderwall et al. .......... | 348/837 |
| 2010/0240390 | A1 * | 9/2010 | Russ et al. ................. | 455/456.1 |
| 2011/0122074 | A1 * | 5/2011 | Chen et al. ................... | 345/173 |
| 2011/0185390 | A1 * | 7/2011 | Faenger et al. ................ | 725/75 |
| 2011/0257973 | A1 * | 10/2011 | Chutorash et al. ............ | 704/235 |
| 2012/0139939 | A1 * | 6/2012 | Russ et al. .................... | 345/619 |
| 2012/0142273 | A1 * | 6/2012 | Ozaki et al. ................. | 455/66.1 |
| 2012/0262492 | A1 * | 10/2012 | Ohashi et al. ................. | 345/660 |

* cited by examiner

*Primary Examiner* — John Q Nguyen
*Assistant Examiner* — Michael Whalen
(74) *Attorney, Agent, or Firm* — Oliff PLC

(57) ABSTRACT

A storage part of an on-vehicle apparatus stores simplified map data of which content is simplified as compared to original map data used for route guidance. An image generator of the on-vehicle apparatus retrieves the simplified map data stored on the storage part and generates a map image based on the simplified map data. Then a transmitter of the on-vehicle apparatus transmits the map image generated by the image generator to a portable device, in response to a demand from the portable device.

17 Claims, 8 Drawing Sheets

ON-VEHICLE APPARATUS

BACKGROUND OF THE INVENTION

1. Field of the Invention

The invention relates to a technology for transmitting data from an on-vehicle apparatus used for a vehicle.

2. Description of the Background Art

On-vehicle apparatuses, such as car navigation apparatus, used for vehicles to display maps have been conventionally known. There is a case where a driver cannot use a function of the on-vehicle apparatus such as route guidance while a fellow passenger other than the driver of the vehicle is looking at, for example, a map of an area around a current location of the vehicle or a map of an area through which the vehicle will go.

However, given convenience for both the diver and the fellow passenger, it is preferable that the fellow passenger can look at information such as a map without preventing the driver from using a function of the on-vehicle apparatus.

A technology that connects an on-vehicle apparatus to a portable device has been proposed as a technology that solves the problem. Such a technology connects the on-vehicle apparatus to the portable device by near field communication and transmits a map from the on-vehicle apparatus to the portable device if necessary. As a result, the map is displayed on a display of the portable device.

However, when the conventional technology is used, the map displayed on the on-vehicle apparatus is displayed on the portable device in a same style. The map is displayed on the portable device in the style designed to be looked at by a driver who is driving. Therefore, the map is not always preferable for the fellow passenger.

SUMMARY OF THE INVENTION

According to one aspect of the invention, an on-vehicle apparatus used in a vehicle includes: a storage part that stores first map data having a simplified content as compared to second map data used for route guidance; an image generator that generates a map image based on the first map data; and a transmitter that transmits the map image to a portable device in response to a demand from the portable device that is a communication partner of the on-vehicle apparatus.

Since the map image based on the first map data having the simplified content as compared to the second map data is transmitted to the portable device, a fellow passenger who carries the portable device can look at a more preferable map for him/her.

According to another aspect of the invention, the on-vehicle apparatus further includes: a receiver that receives from the portable device destination information specifying a destination of the vehicle; and a guidance part that executes the route guidance leading to the destination specified by the destination information.

The destination of the route guidance executed by the on-vehicle apparatus can be specified from the portable device.

According to another aspect of the invention, the on-vehicle apparatus further includes a data generator that generates the first map data based on the second map data.

Since the first map data is generated based on the second map data, there is no need to prepare the first map data separately from the second map data, and cost of the on-vehicle apparatus can be reduced.

Therefore, the object of this invention is to provide a preferable map for a fellow passenger to a portable device carried by the fellow passenger.

These and other objects, features, aspects and advantages of the invention will become more apparent from the following detailed description of the invention when taken in conjunction with the accompanying drawings.

DESCRIPTION OF THE EMBODIMENTS

1. Outline of on-Vehicle Apparatus

Figure 1A:
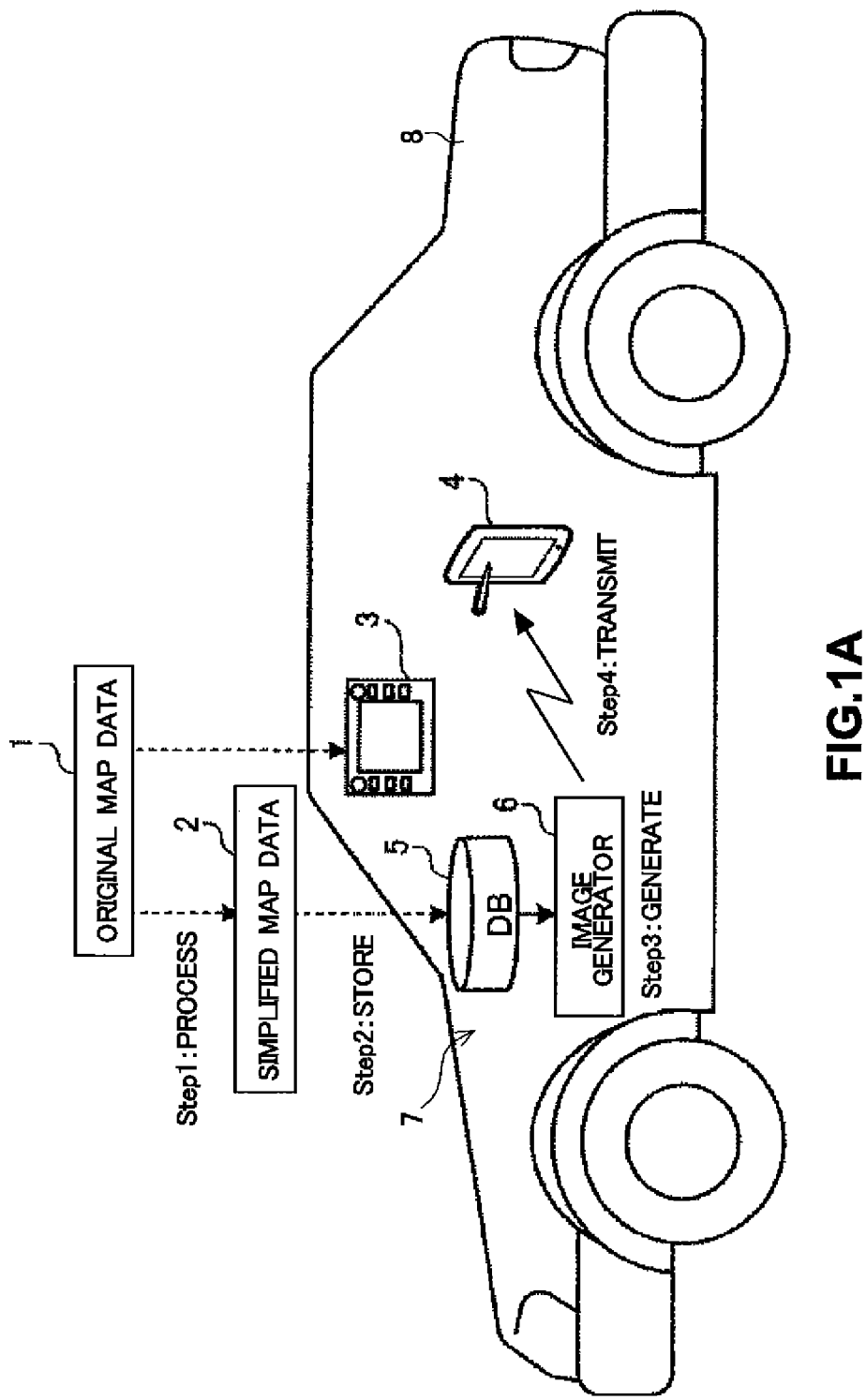
FIG. 1A illustrates an outline of an on-vehicle apparatus.

Referring to the accompanying drawings, an embodiment of an on-vehicle apparatus related to the invention is explained hereinbelow in detail. Prior to the detailed explanation of the embodiment, an outline of the on-vehicle apparatus is first explained referring to FIG. 1A. FIG. 1A illustrates the outline of an on-vehicle apparatus 7. The on-vehicle apparatus 7 is used on a vehicle 8.

As shown in FIG. 1A, the on-vehicle apparatus 7 includes a simplified map database 5 that stores simplified map data 2. The simplified map data 2 is map data generated by omitting a part of element data included in original map data 1. The on-vehicle apparatus 7 transmits a map image generated based on the simplified map data 2, to a portable device 4 that is a communication partner of the on-vehicle apparatus 7.

The original map data 1 is map data (mainly vector data) used to generate the map image designed to be looked at by a driver while driving. The original map data 1 includes various element data, such as road data, facility data and icons image data, used for generating the map image. The original map data 1 is prepared on each of various scales. The map images on different scales can be displayed on a display 3 by using the original map data 1, and comfortable route guidance can be provided to the driver.

However, the map image displayed on a display 3 of the on-vehicle apparatus 7 for the route guidance is not always displayed in a style easy for a fellow passenger to look at. In other words, the fellow passenger does not need, in many cases, a detailed map like a map used for the route guidance, and an easy-to-understand or enjoyable map is preferable for the fellow passenger.

In the on-vehicle apparatus 7, the simplified map data 2 of which a content is simplified as compared to the original map data 1 used for the route guidance is stored beforehand in the simplified map database 5 (a step 2). The on-vehicle apparatus 7 can provide an easy-to-understand or enjoyable map to the fellow passenger by generating the map image to be provided to the portable device 4, based on the simplified map data 2. Moreover, the simplified map data 2 is generated by omitting a part of the element data included in the original map data 1 (a step 1). Therefore, cost of the on-vehicle apparatus 7 can be reduced because there is no need to prepare the original map data 1 and the simplified map data 2 individually.

Next described are examples of a method for generating the simplified map data 2. First, from amongst the original map data 1 prepared on individual scales, the original map data 1 on a scale preferable to be displayed on the portable device 4 is selected.

Next, a part of the element data included in the original map data 1 on the scale selected (hereinafter referred to as "selected map data") is eliminated. For example, traffic light data included in the road data and POT data included in the facility data are eliminated.

Next, a part of contents of the element data remaining and included in the selected map data is changed. For example, a font type of text data or/and a language type of the text data included in the selected map data is changed to a different type of the text data. Moreover, for example, a part of various facility icons included in the selected map data are changed to facility icons enjoyable for the fellow passenger. Furthermore, a part of the facility icons unimportant to the fellow passenger are eliminated. The simplified map data 2 generated in such a manner is registered in the simplified map database 5.

Thus, the simplified map data 2 is generated by omitting a part of the element data included in the original map data 1. Therefore, it is possible to prevent a large increase in cost of the on-vehicle apparatus 7. Moreover, since the simplified map data 2 is generated based on the original map data 1 on one scale, a data volume of the simplified map database 5 can be significantly reduced as compared to a database including the original map data 1 on various scales.

Since the simplified map data 2 is generated by eliminating a part of the element data such as the POI data, when a map based on the simplified map data 2 is displayed, an amount of information provided to a user can be reduced. Therefore, an easy-to-understand map can be provided to the fellow passenger. Moreover, icons such as the facility icons and the language type and the font type of the text data are changed to be friendlier to the fellow passenger. Therefore, the on-vehicle apparatus 7 can provide a map more enjoyable for the fellow passenger.

For example, when the fellow passenger is a child, the on-vehicle apparatus 7 can display a map that shows a same area as a map at which the driver looks and that is indicated with illustrations or the like, for easy understanding even for children, on the portable device 4 such as a game console carried by the fellow passenger. As a result, the map is easier for the fellow passenger to understand and communication between the driver and the fellow passenger can be promoted. Moreover, in this case, a part of the map (e.g. icons) may be shown in animation.

Moreover, when the mother tongue (a first language) of the driver is different from the mother tongue (a second language) of the fellow passenger, a map having the text data in the second language changed from the first language can be displayed on the portable device 4 carried by the fellow passenger. As a result, since the map is easier for the fellow passenger to understand, communication between the driver and the fellow passenger can be promoted. For example, when the first language is Japanese and the second language is Chinese, Japanese text data is displayed on the map on the on-vehicle apparatus 7 at which the driver looks, and Chinese text data is displayed on the map on the portable device 4 at which the fellow passenger looks.

When the fellow passenger is an elderly person, a map having the text data of which font type has been changed to be easily recognizable (in a large font size, etc.) to the fellow passenger can be displayed on the portable device 4 carried by the fellow passenger. As a result, since the map is easier for the fellow passenger to understand, communication between the driver and the fellow passenger can be promoted.

The aforementioned are examples of the method for generating the simplified map data 2. However, out of the element data included in the original map data 1, element data to be omitted or to be changed may be different from the element data described in the aforementioned examples. As a result, various types of the simplified map data 2 can be generated.

For example, road data of a road of which width is narrow, 3-D data, etc. may be omitted. Background color data that determines color shade of the map image generated based on the simplified map data 2, may be changed.

As shown in FIG. 1A, the simplified map data 2 generated is converted to the map image by an image generator 6 (a step 3). The map image is, for example, raster data and compressed in a predetermined compression technology to reduce data volume of the map image. A widely-known technology, such as JPEG (Joint Photographic Experts Group) and PIC, is used for the compression.

In response to a demand from the portable device 4, the image generator 6 retrieves the simplified map data 2 of a necessary area (an area around a location of the vehicle 8 or an area specified by the portable device 4) from the simplified map database 5, and generates the map image based on the simplified map data 2 retrieved. The map image is transmitted to the portable device 4 from the image generator 6 (a step 4) and is displayed on the portable device 4.

Figure 1B:
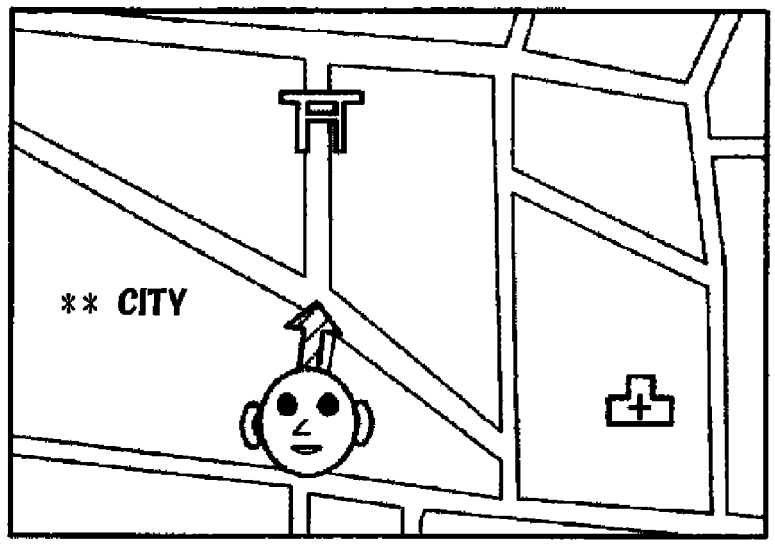
FIG. 1B illustrates an example of a map image displayed on a portable device.
Figure 1C:
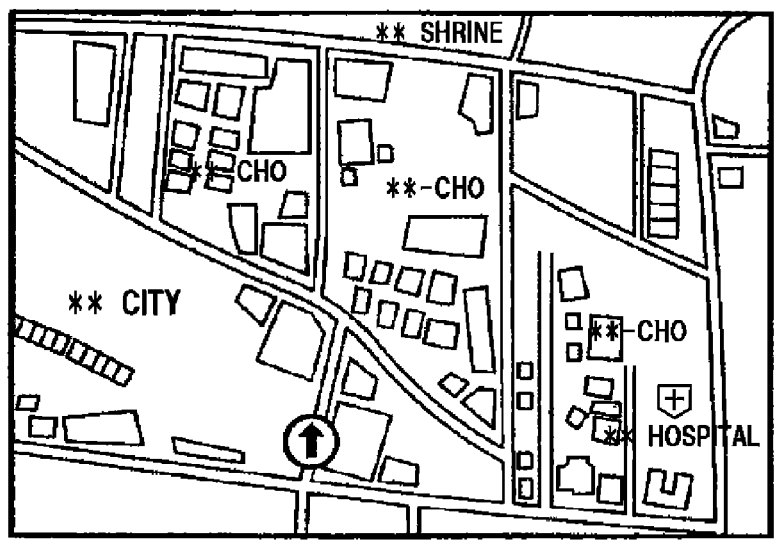
FIG. 1C illustrates an example of a map image used for route guidance.

FIG. 1B illustrates an example of a map image displayed on the portable device 4. And FIG. 1C illustrates an example of a map image used for route guidance displayed on the display 3 of the on-vehicle apparatus 7. As shown in a comparison between these drawings, the map image (FIG. 1B) displayed on the portable device 4 is easier to understand and more enjoyable than the map image (FIG. 1C) used for the route guidance displayed on the display 3.

The map image (FIG. 1B) displayed on the portable device 4 is displayed like an illustration as compared to the map image (FIG. 1C) used for the route guidance, by changing the icons and a font type. Therefore, the map image (FIG. 1B) displayed on the portable device 4 is easier to understand and enjoyable for the fellow passenger. Moreover, since less text data is included in the map image (FIG. 1B) displayed on the portable device 4 as compared to the map image (FIG. 1C) used for the route guidance, complexity of contents of the map can be reduced.

2. Embodiment

Next described is an embodiment of an on-vehicle apparatus of the invention in detail. Hereinbelow, the embodiment is described by taking as an example an on-vehicle apparatus having a function of generating simplified map data from original map data. However, the on-vehicle apparatus is not limited to the embodiment, and may store the simplified map data beforehand.

Figure 2:
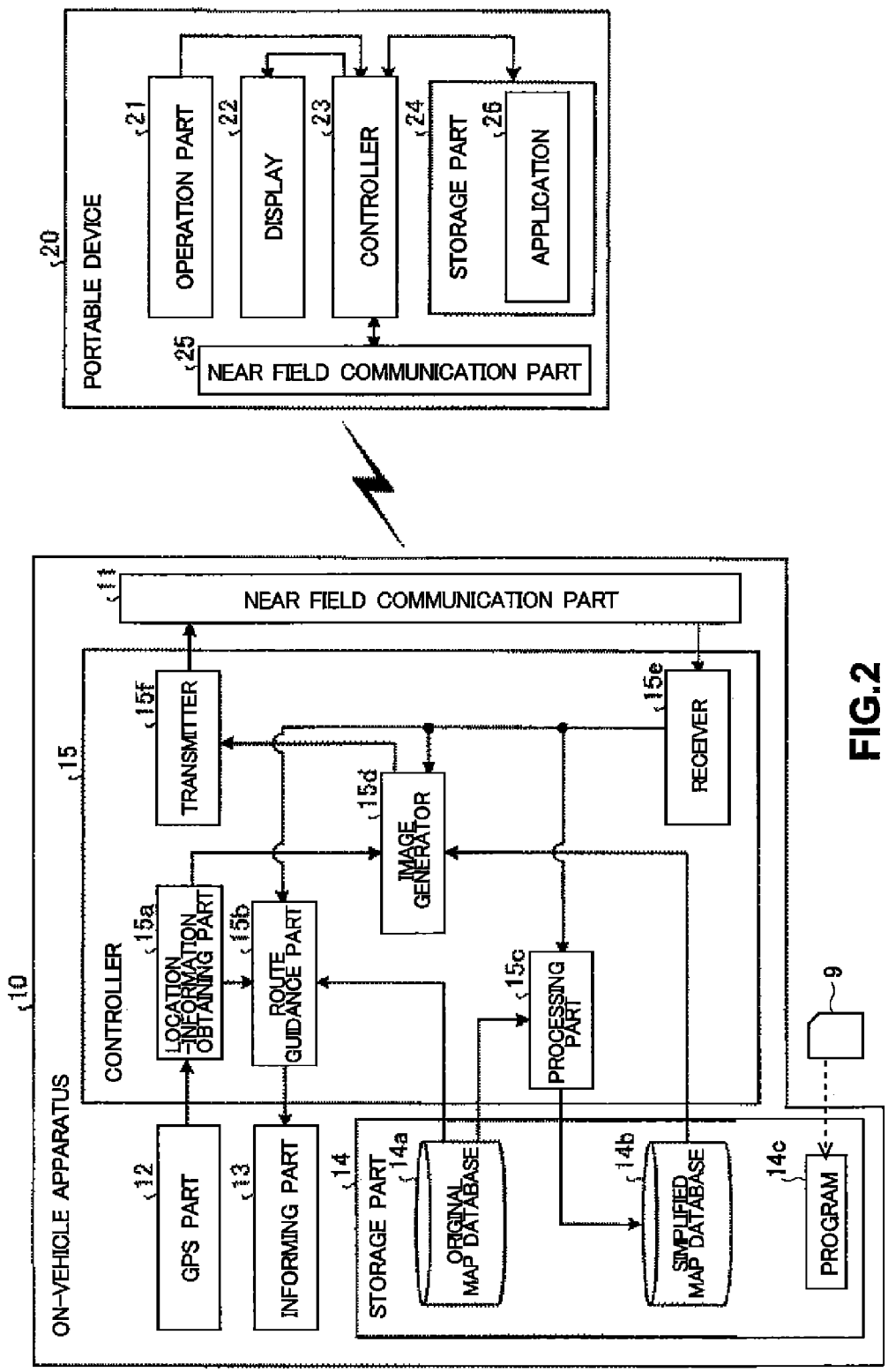
FIG. 2 illustrates a configuration of the on-vehicle apparatus.

A configuration of the on-vehicle apparatus in the embodiment is explained referring to FIG. 2. FIG. 2 illustrates the configuration of the on-vehicle apparatus in the embodiment. In the explanation, an on-vehicle apparatus 10 in FIG. 2 is a car navigation apparatus. However, configuration elements required to explain characteristics of the on-vehicle apparatus 10 are mainly indicated and descriptions of general configuration elements are omitted.

As shown in FIG. 2, the on-vehicle apparatus 10 includes a near field communication part 11, a GPS part 12, an informing part 13, a storage part 14, and a controller 15.

The near field communication part 11 transmits and receives data to/from a portable device 20 by near field communication using Bluetooth (registered trademark). Similarly the portable device 20 also has a function of near field communication by Bluetooth (registered trademark). The portable device 20 is a portable device, such as a cell phone, a PHS (Personal Handy-phone System), a PDA (Personal Digital Assistant) and a game console.

The portable device 20 includes an operation part 21, a display 22, a controller 23, a storage part 24, and a near field communication part 25. In response to an operation to the operation part 21 by a user of the portable device 20, the controller 23 retrieves and executes a program of an application 26 stored in the storage part 24. Thus, the on-vehicle apparatus 10 is communicably connected to the portable device 20.

For example, the controller 23 demands a desired map image from the on-vehicle apparatus 10 via the near field communication part 25 by retrieving and executing the program of the application 26. The controller 23 obtains the map image transmitted from the on-vehicle apparatus 10 in response to the demand and displays the map image on the display 22. As described later, the map image displayed on the display 22 is generated based on the simplified map data. Therefore, the map image is suitable to a fellow passenger.

This embodiment explains a case where Bluetooth (registered trademark) is used for communication between the on-vehicle apparatus 10 and the portable device 20. However, another wireless communication standard such as Wi-Fi (registered trademark) and ZigBee (registered trademark) may be used for the communication. Moreover, wire communication may be used for the communication between the on-vehicle apparatus 10 and the portable device 20.

The GPS part 12 of the on-vehicle apparatus 10 includes a GPS antenna and a GPS receiver. The GPS antenna receives a GPS signal from a satellite and transmits the GPS signal to the GPS receiver. The GPS receiver outputs to the controller 15 GPS information generated by demodulating the GPS signal received from the GPS antenna.

The informing part 13 informs the user of the information. The informing part 13 includes a display, such as a liquid crystal display, and a sound output part that outputs sound based on sound information via an on-vehicle speaker. The display of the informing part 13 displays an image output from the controller 15. The display of the informing part 13 is operable to display an image, for example, in WVGA size (800×480).

The storage part 14 stores an original map database 14a, a simplified map database 14b, and a program 14c. The original map database 14a includes an original map data used for route guidance. The original map data is map data for generating a map image designed to be looked at by a driver while driving.

Figure 3:
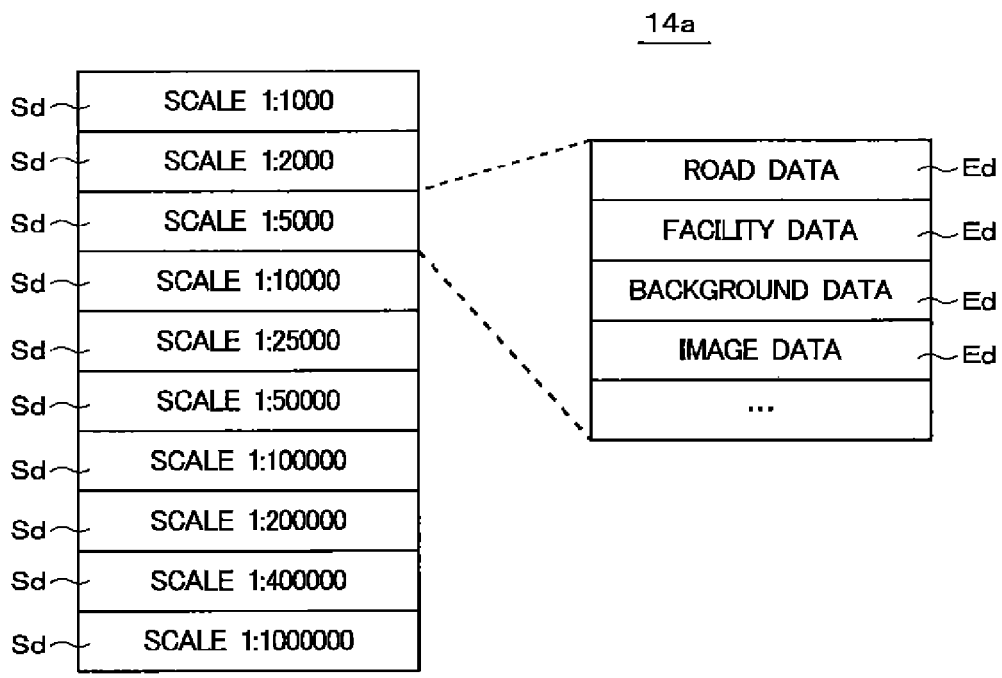
FIG. 3 illustrates a data structure of an original map database.

FIG. 3 illustrates a data structure of the original map database 14a. As shown in FIG. 3, the original map database 14a includes original map data Sd on each scale of, for example, "1:1000," "1:2000," "1:5000," "1:10000," "1:25000," "1:50000," "1:100000," "1:200000," "1:400000," and "1:1000000." Moreover, the original map data Sd on each scale includes element data Ed such as, road data, facility data, background data, and image data.

The road data includes, for example, node data and link data. The node data is information of nodes (points of elements) that are connecting points of roads. The node data includes attribute information such as a longitude, a latitude and an altitude of each node, and a junction of roads, and a fork in a road, width of a road, and the type of a road (national road, prefectural road, highway, etc.). The link data is information of links that link the nodes. The link data includes attribute information such as inclination, and a raised or an underground part of each link (between nodes), and distance information.

The facility data includes types of facilities (e.g. school, convenience store, bank, park, etc.), location coordinates indicating locations of the facilities, area information indicating areas of the facilities, and POI data including detailed information on the facilities.

The background data includes background color data and data indicating terrain, etc. Moreover, the image data includes data of images such as facility icons and a crossroad icon.

Referring back to FIG. 2, the configuration of the on-vehicle apparatus 10 is described. The simplified map database 14b includes the simplified map data. The simplified map data is map data for generating the map image to be transmitted to the portable device 20.

The on-vehicle apparatus 10 has a storing function of storing the simplified map data and the on-vehicle apparatus 10 may store the simplified map data in any manner. Therefore, a storage manner is not limited to the manner shown in this embodiment where the storage part 14 of the on-vehicle apparatus 10 has the simplified map database 14b including the simplified map data. For example, the storage part 14 may include a storage apparatus dedicated to storing the simplified map database 14b. Moreover, a part of a storage area of the storage part 14 may be a storage area for storing the simplified map data. Furthermore, the on-vehicle apparatus 10 may include a storage apparatus dedicated to storing the simplified map data separately from the storage part 14.

A method for generating the simplified map data includes, but is not limited to a case, explained in this embodiment as an example, where the simplified map data is generated from the original map data by a processing part 15c, described below, of the controller 15. In other words, the simplified map data generated from the original map data does not necessarily need to be generated in an on-vehicle apparatus. For example, the on-vehicle apparatus may obtain the simplified map data generated beforehand, from a predetermined server (a server installed in, for example, an external center) on a network via a network communication part (not illustrated), and may store the simplified map data on the on-vehicle apparatus. Moreover, when the on-vehicle apparatus 10 is manufactured, the simplified map data may be stored on the on-vehicle apparatus 10. Furthermore, the on-vehicle apparatus may retrieve the simplified map data from a portable recording medium storing the simplified map data via a reader (not illustrated), and may store the simplified map data retrieved on the on-vehicle apparatus.

The controller 15 controls the entire on-vehicle apparatus 10. The controller 15 includes a location-information obtaining part 15a, a route guidance part 15b, the processing part 15c, an image generator 15d, a receiver 15e, and a transmitter 15f.

FIG. 2 illustrates a functional configuration of the controller 15. The controller 15 physically includes a computer having a CPU (Central Processing Unit), a ROM (Read Only Memory) and a RAM (Random Access Memory). The CPU retrieves the program 14c stored on the storage part 14 (or the ROM) and executes the program 14c using the RAM as a working area. As a result, functions of the location-information obtaining part 15*a*, the route guidance part 15*b*, the processing part 15*c*, the image generator 15*d*, the receiver 15*e*, the transmitter 15*f*, etc. are implemented. The on-vehicle apparatus 10 can obtain the program 14*c* by retrieving the program 14*c* from a storage medium 9, such as a non-transitory computer-readable memory card, storing the program 14*c*, via a reader (not illustrated). The on-vehicle apparatus 10 can also obtain the program 14*c* by downloading the program 14*c* from a predetermined server on a network via a network communication part (not illustrated).

The location-information obtaining part 15*a* obtains location information (concretely, latitude information and longitude information) indicating a location of the on-vehicle apparatus 10 at a point in time, based on the GPS information output from the GPS part 12. The location information indicates the location of a vehicle on which the on-vehicle apparatus 10 is installed.

The route guidance part 15*b* provides the route guidance to show a route to a destination of the vehicle, to the driver. The route guidance part 15*b* obtains a part of an area from the original map data on one of the scales included in the original map database 14*a*. Concretely, the route guidance part 15*b* obtains an area required for the route guidance, out of the original map data on a scale selected by the user of the on-vehicle apparatus 10.

For example, when a scale of "1:5000" is selected by the user of the on-vehicle apparatus 10, the route guidance part 15*b* obtains only an area required for the route guidance, out of the original map data on the scale of "1:5000" from the original map database 14*a*.

The route guidance part 15*b* determines the area required for the route guidance, for example, based on a destination specified by the user of the on-vehicle apparatus 10 and the location information (a location of the vehicle) that the location-information obtaining part 15*a* obtains.

Then the route guidance part 15*b* generates the map image, for example, in WVGA size, based on the original map data only of the part of the area obtained from the original map database 14*a*. Then the route guidance part 15*b* outputs the map image generated to the informing part 13 and displays the map image on display of the informing part 13. Moreover, the route guidance part 15*b* sets a route to the destination if the destination is set. Then the route guidance part 15*b* causes the sound output part of the informing part 13 to output voice guidance guiding the vehicle to travel along the route set.

Figure 4:
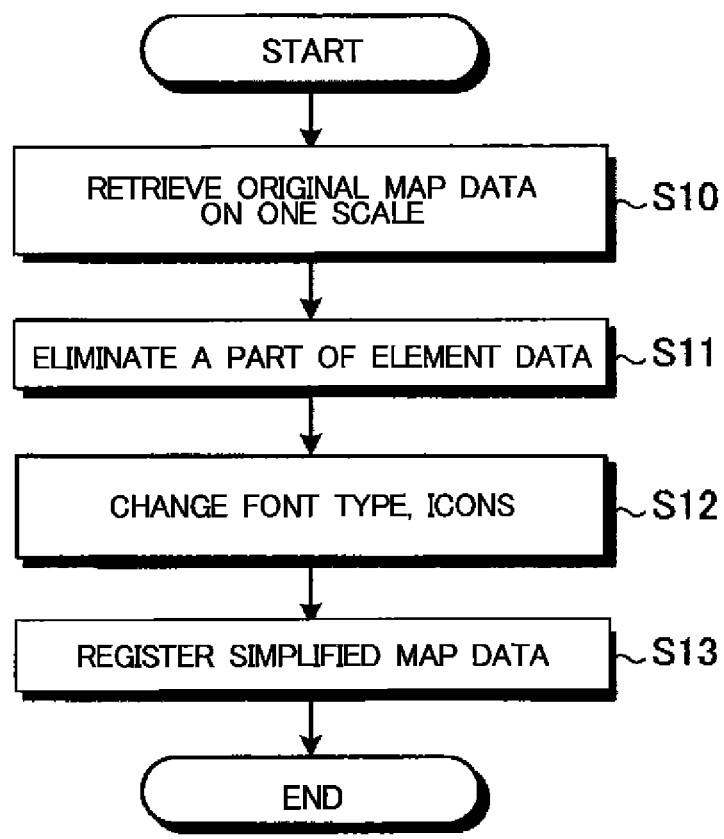
FIG. 4 illustrates a procedure for generating a simplified map data.

The processing part 15*c* generates the simplified map data by omitting a part of the element data included in the original map data. FIG. 4 illustrates an example of a procedure where the processing part 15*c* generates the simplified map data. Referring to FIG. 4, the procedure for generating the simplified map data is concretely described.

FIG. 4 illustrates only an example of the procedure for generating the simplified map data, and the procedure for generating the simplified map data includes, but is not limited to the procedure shown in FIG. 4. The procedure for generating the simplified map data may be any procedure where a part of the element data included in the original map data is omitted and the simplified map data is generated.

As shown in FIG. 4, the processing part 15*e* selects one scale from amongst many scales. Then the processing part 15*c* retrieves the original map data on the scale selected (in other words selected map data) from the original map database 14*a* (a step S10). The processing part 15*c* selects a scale on which a map is easy for the fellow passenger to understand.

In many cases, the fellow passenger desires to look at a map of a wide area, to an extent, rather than a detailed map. In other words, a scale of, for example, "1:10000" or "1:25000," is preferable to the fellow passenger in many cases rather than a scale of, for example, "1:1000" or "1:2000." Therefore, the processing part 15*c* selects a scale of, for example, "1:10000" and retrieves the selected map data on the scale of "1:10000."

Next, the processing part 15*c* eliminates a part of the element data of the selected map data (a step S11). For example, the processing part 15*c* eliminates traffic light data included in the road data, the POI data included in the facility data, etc. in the selected map data.

Moreover, the processing part 15*c* changes a part of contents of the element data remaining and included in the selected map data. Accordingly, a font type and a language type of text data, icons, etc. included in the selected map data are changed and then the simplified map data is generated (a step S12).

Figure 5:
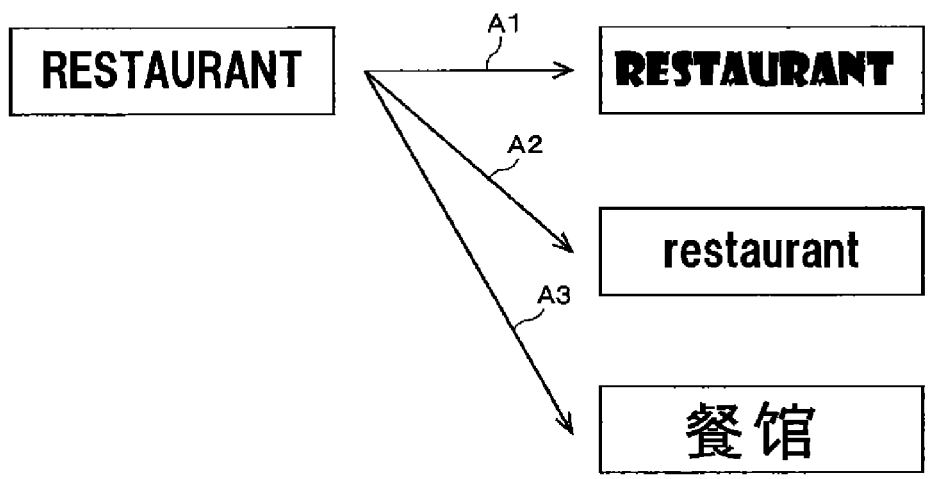
FIG. 5 illustrates an example of changing text data.

For example, the text data included in the selected map data is changed to text data in a different font type, to text data in a different language type, etc. An arrow A1 in FIG. 5 indicates an example where the font type of text data "RESTAURANT" is changed. Moreover, an arrow A2 in FIG. 5 indicates an example where the character type of the text data "RESTAURANT" is changed. Furthermore, an arrow A3 in FIG. 5 indicates an example where the language type of the text data "RESTAURANT" is changed.

Figure 6A:
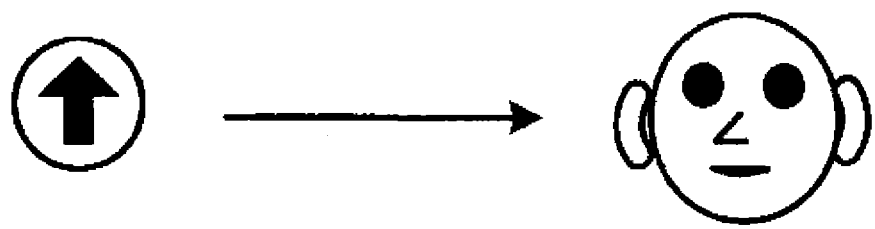
FIG. 6A illustrates an example of changing an icon.
Figure 6B:
FIG. 6B illustrates an example of changing an icon.

Moreover, for example, image data of a current location icon indicating a current location of the vehicle, facility icons, etc. included in the selected map data are changed to image data of the icons in different forms. FIG. 6A illustrates an example where the current location icon is changed to a different icon. Furthermore, FIG. 6B illustrates an example where an icon for hospitals that is one of facility icons, is changed to a different icon.

Then the processing part 15*c* registers the simplified map data generated in the simplified map database 14*b* (a step S13). As a result, the simplified map data generated is stored on the storage part 14. Data (font types, icons, etc. and hereinafter referred to as "change data") that the processing part 15*c* uses to change a content of the element data, may be stored on the processing part 15*c* beforehand.

Moreover, the on-vehicle apparatus 10 may obtain the change data transmitted from an external apparatus and store the change data on the processing part 15*c*. For example, the on-vehicle apparatus 10 may obtain the change data from a predetermined server storing the change data, on a network such as the Internet, via a network communication part (not illustrated), and may store the change data obtained on the processing part 15*c*.

Furthermore, the application 26 of the portable device 20 may transmit the change data to the on-vehicle apparatus 10, and the processing part 15*c* may obtain the change data via the receiver 15*e*. In such a manner, the simplified map data can be generated based on the application 26 of the portable device 20. Therefore, the user of the portable device 20 can look at the map image based on desired simplified map data only by changing the application 26.

It is preferable that the processing part 15*c* generates the simplified map data and registers the simplified map data generated to the simplified map database 14*b* before the processing part 15*c* communicates with the portable device 20, in order to provide the map image speedily to the portable device 20.

Referring back to FIG. 2, the configuration of the on-vehicle apparatus 10 is described. The image generator 15*d* obtains the simplified map data from the simplified map database 14*b*, in response to a demand from the portable device 20, and generates the map image based on the simplified map data. For example, the image generator 15*d* retrieves the simplified map data corresponding to an area based on the demand from the portable device 20, and generates the map image based on the simplified map data retrieved.

A size of the map image generated by the image generator 15*d* is bigger than a display size displayable on the display 22 of the portable device 20. Since the image generator 15*d* generates the map image bigger than the display size to be displayed on the display 22 of the portable device 20, a certain range of a map can be displayed by scrolling the map without communication between the portable device 20 and the on-vehicle apparatus 10.

In addition, the portable device 20 demands the map image of an area specified by a latitude and a longitude or of an area where the vehicle is located. When the portable device 20 demands the map image of an area specified by a latitude and a longitude, information including the latitude and the longitude is transmitted from the portable device 20. The image generator 15*d* retrieves, from the simplified map database 14*b*, the simplified map data of the area corresponding to the latitude and the longitude transmitted by the portable device 20, and generates the map image based on the simplified map data retrieved.

On the other hand, when the portable device 20 demands the map image of an area where the vehicle is located, information including the demand is transmitted by the portable device 20. In this case, the image generator 15*d* retrieves, from the simplified map database 14*b*, the simplified map data of the area corresponding to the location information (the location of the vehicle) obtained from the location-information obtaining part 15*a*, and generates the map image based on the simplified map data retrieved.

The receiver 15*e* obtains a signal transmitted from the portable device 20 via the near field communication part 11. For example, the receiver 15*e* receives, from the portable device 20, a map demand signal including information indicating the aforementioned area demand. The transmitter 15*f* transmits the map image and the like generated by the image generator 15*d* to the portable device 20 via the near field communication part 11.

The above description explains that the icons, the language type, the font type, etc. are changed at a time when the processing part 15*c* generates the simplified map data from the original map data. On the other hand, the icons, the language type, the font type, etc. may be changed at a time when the image generator 15*d* generates the map image from the simplified map data. In this case, the change data (font types, icons, etc.) used for a change of the contents of the element data is stored on the image generator 15*d* beforehand.

Also, in this case, the application 26 of the portable device 20 may transmit the change data to the on-vehicle apparatus 10, and the image generator 15*d* may obtain the change data via the receiver 15*e*. In such a manner, the user of the portable device 20 can look at his/her desired map image only by changing the application 26.

Moreover, multiple icons, language types, font types, etc. may be prepared as selectable change data in the simplified map database 14*b*. In this case, the image generator 15*d* can select icons, a language type, a font type, etc. in response to a demand from the portable device 20, and can generate the map image having the icon selected in the language type and the font type selected.

For example, icons and a font type suitable to each age group such as elementary school, junior high school, and high school, may be prepared. In this case, an age group is specified with the portable device 20. Based on the age groups specified, the image generator 15*d* selects icons, a font type, etc. and provides a map image having the icons selected in the font type selected. Moreover, text data in various language types may be prepared, and from amongst the various language types, a language type specified by the portable device 20 is selected and the map image in the language type selected may be provided.

Furthermore, for example, icons and a font type for each category of, for example, sex of male or female, season, and region, may be prepared. In this case, too, icons and a font type in the category specified are selected, and the map image having the icons selected in the font type selected is provided.

In such a manner, the preparation of various types of icons and fonts allows the fellow passenger who operates the portable device 20 to be provided with a map suitable for him/her and to enjoy looking at the map. In addition, according to the age group, the sex, the season, the region, etc. mentioned above, the image generator 15*d* may change the background color or may change types of the element data (POI data, etc.) to be omitted.

Figure 7:
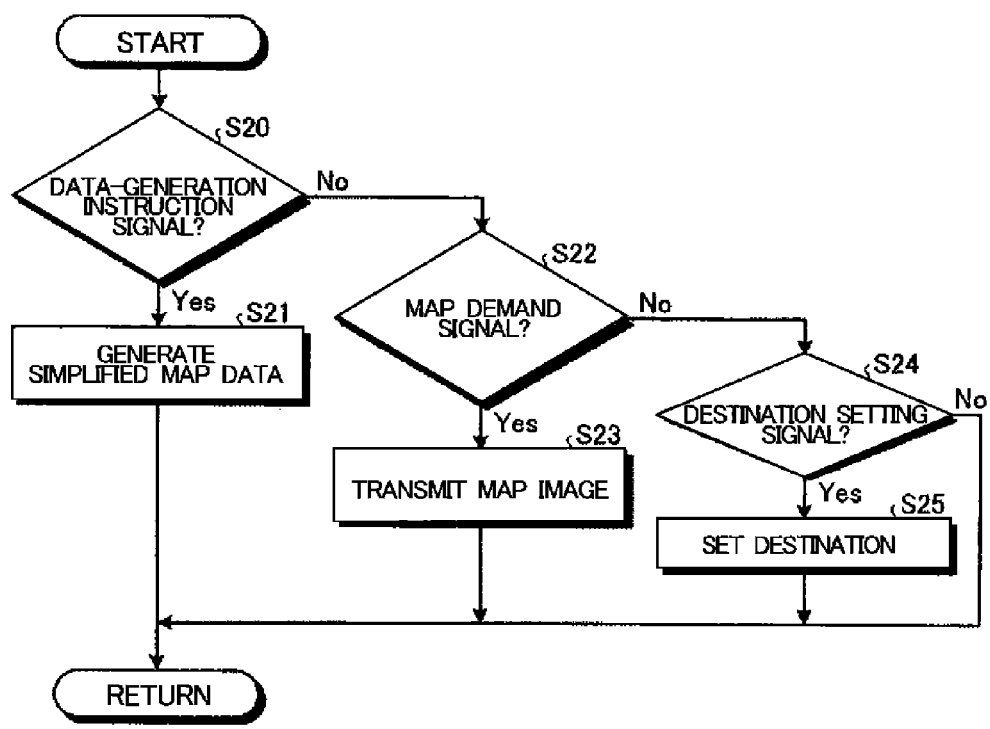
FIG. 7 is a flowchart showing main process procedure performed by the on-vehicle apparatus.

Next described is concrete behavior of the on-vehicle apparatus 10 in this embodiment referring to FIG. 7. FIG. 7 illustrates a flowchart showing main process procedure performed by the on-vehicle apparatus 10.

As shown in FIG. 7, the on-vehicle apparatus 10 determines whether or not the receiver 15*e* has received, from the portable device 20, a data-generation instruction signal for an instruction to generate the simplified map data (a step S20). When the receiver 15*e* has received the data-generation instruction signal (Yes in the step S20), the processing part 15*c* generates the simplified map data based on the original map data in response to the data-generation instruction signal, and registers the simplified map data generated in the simplified map database 14*b* in the storage part 14 (a step S21).

The data-generation instruction signal transmitted from the portable device 20 includes specification information specifying a language type, a font type, icons, etc. to which an original language type, an original font type, and original icons, etc are changed. Based on the specification information included in the data-generation instruction signal, the processing part 15*c* generates the simplified map data by, for example, changing the language type, the font type, the icons, etc. of the text data.

A content of the specification information included in such a data-generation instruction signal can be changed by a user operation to the operation part 21 of the portable device 20. For example, the fellow passenger who carries the portable device 20 can specify a content of an element changeable or selectable, such as the language type, the font type, the icons, etc., by operating the operation part 21. One of the scales, the element data to be omitted, etc. may be specified by the user operation to the operation part 21 of the portable device 20.

In the step S20, when the receiver 15*e* has not received the data-generation instruction signal (No in the step S20), it is determined whether or not the receiver 15*e* has received, from the portable device 20, the map demand signal for a demand to transmit the map image (a step S22). The map demand signal is transmitted with a predetermined period from the portable device 20 to the on-vehicle apparatus 10 during execution of the application 26.

When the receiver 15*e* has received the map demand signal (Yes in the step S22), the image generator 15*d* obtains the simplified map data from the simplified map database 14*b* in the storage part 14. Then, based on the simplified map data, the image generator 15*d* generates the map image of an area corresponding to a demand from the portable device 20. And then the transmitter 15*f* transmits the map image generated by the image generator 15*d* to the portable device 20 (a step S23).

In the step S22, when the receiver 15e has not received the map demand signal (No in the step S22), it is determined whether or not the receiver 15e has received, from the portable device 20, a destination setting signal for an instruction to set a destination (a step S24). The destination setting signal includes destination information specifying a destination of the vehicle.

When the receiver 15e has received the destination setting signal (Yes in the step S24), the route guidance part 15b sets the destination specified by the destination information included in the destination setting signal, as a route guidance destination. Then the route guidance part 15b provides the route guidance leading to the destination (a step S25).

While looking at the map image displayed on the display 22, the fellow passenger that is the user of the portable device 20 can specify a location of the destination of the vehicle by operating the operation part 21. As a result, the destination setting signal including the destination information is transmitted to the on-vehicle apparatus 10 from the controller 23 of the portable device 20. In such a manner, it is possible to specify the destination of the route guidance provided by the on-vehicle apparatus 10, by using the portable device 20.

When process of the step S21, S23, or S25 ends or when the receiver 15e has not received the destination setting signal in the step S24 (No in the step S24), the process goes back to the step S20.

As described above, the on-vehicle apparatus 10 in this embodiment includes the storage part 14 that stores the simplified map data generated by omitting a part of the element data included in the original map data used for the route guidance. The image generator 15d generates the map image based on the simplified map data stored on the storage part 14, and then the transmitter 15f transmits the map image to the portable device 20.

Therefore, the map image based on the simplified map data of which contents are simplified as compared to the original map data used for the route guidance is transmitted to the portable device 20. As a result, the fellow passenger using the portable device 20 can look at a map more preferable to the fellow passenger. In addition, the on-vehicle apparatus 10 does not have to prepare the simplified map data 2 separately from the original map data 1 but generates the simplified map data by omitting a part of the element data included in the original map data. Therefore, a large cost increase of the on-vehicle apparatus 10 can be prevented.

Moreover, information amount included in the map image based on the simplified map data is reduced. Therefore, it is possible to provide map information easy for the fellow passenger to understand. Furthermore, it is possible to provide a map enjoyable for the fellow passenger due to the change of icons such as the facility icons, and types of the language and the font of the text data.

3. Modifications

The embodiments of the invention have been described in detail based on the drawings. However, the embodiments are examples and it is possible to implement the invention in other forms other than the aforementioned embodiments, by changing, converting, and improving the aforementioned embodiments based on knowledge of the skilled in the art.

For example, a processing part 15c may generate simplified map data, if necessary, instead of having a simplified map database 14b. In this manner, an original map database 14a and the processing part 15c work together to bear functions of the simplified map database 14b. As a result, a storage capacity needed for the simplified map database 14b in the storage part 14 can be reduced.

In the aforementioned embodiments, the simplified map data prepared beforehand is registered in the simplified map database 14b in the storage part 14, and when the map demand signal is received from the portable device 20, the image generator 6 retrieves the simplified map data of a necessary area from the simplified map database 14b, and the transmitter 15f transmits to the portable device 20 the map image based on the simplified map data. On the other hand, simplified map data is not prepared beforehand, but when a map demand signal is received from a portable device 20, a processing part 15c may retrieve the original map data of a necessary area from the original map database 14a, may generate the simplified map data based on the original map data and then may cause the simplified map data to be stored in a RAM in a controller 15. In this case, an image generator 6 retrieves the simplified map data from the RAM and a transmitter 15f transmits a map image based on the simplified map data, to the portable device 20.

In the aforementioned embodiments, the image generator 15d generates the map image compressed in a method such as JPEG and PIC, and the map image is transmitted to the portable device 20. On the other hand, an image generator 15d may clip a part of simplified map data as a map image, corresponding to a necessary area, and may transmit the map image (simplified map data) to a portable device 20. In this case, a controller 23 of the portable device 20 generates an image to be displayed on a display 22, based on the simplified map data obtained from an on-vehicle apparatus 10.

Moreover, in the aforementioned embodiments, the simplified map data is generated by eliminating a part of the element data included in the original map data (e.g. the traffic light data included in the road data, and the POI data included in the facility data), and then by changing a part of the contents (font type, language type, icons, etc.) of the element data remaining and included in the original map data of which a part of the element data is eliminated. On the other hand, original map data of which a part of element data is only eliminated may be used as simplified map data. In this case, an on-vehicle apparatus transmits a map image based on the simplified map data, to a portable device. Then the portable device changes the font type, the language type, the icons, etc. using change data stored on the portable device. As a result, it is easier to reflect the taste of a user to the map image to be displayed on the portable device. Therefore, it is possible to provide map information easier to understand and more enjoyable for the user.

As described above, the on-vehicle apparatus of the invention is effective in transmission of a map image easy to understand and enjoyable mainly for a fellow passenger, to a portable device. This invention is suitable to car apparatuses, especially, car navigation apparatuses.

While the invention has been shown and described in detail, the foregoing description is in all aspects illustrative and not restrictive. It is therefore understood that numerous other modifications and variations can be devised without departing from the scope of the invention.

What is claimed is:

1. An on-vehicle apparatus used in a vehicle, the on-vehicle apparatus comprising:
   a storage part that stores first map data having a simplified content as compared to second map data, the second map data being displayed on an on-vehicle display and being used for route guidance;

an image generator that generates a map image based on the first map data;

a near field communication part including a transmitter, the near field communication part further including a receiver that receives from a portable electronic device, specification information specifying the attribute of the user of the portable electronic device; and a data generator that generates the first map data based on the second map data, the data generator generating the first map data by changing a part of element data included in the second map data in accordance with the attribute specified by the specification information, wherein when the portable electronic device that is a communication partner of the on-vehicle apparatus is in the vehicle, the transmitter transmits the map image to the portable electronic device in response to a demand from the portable electronic device, the first map data is map data generated by changing a part of element data included in the second map data in accordance with an attribute of a user of the portable electronic device without changing the second map data, a user of the of the on-vehicle apparatus is a driver of the vehicle, and the user of the portable electronic device is a passenger other than the driver of the vehicle.

2. The on-vehicle apparatus according to claim 1, wherein the first map data is map data in which a part of element data included in the second map data is omitted.

3. The on-vehicle apparatus according to claim 1, wherein the first map data is map data in which a font type of text data included in the second map data is changed.

4. The on-vehicle apparatus according to claim 1, wherein the first map data is map data in which a language type of text data included in the second map data is changed.

5. The on-vehicle apparatus according to claim 1, wherein the first map data is map data in which an icon included in the second map data is changed.

6. The on-vehicle apparatus according to claim 1, wherein the near field communication part further includes a receiver that receives from the portable electronic device destination information specifying a destination of the vehicle; and the on-vehicle apparatus further comprises a guidance part that executes the route guidance leading to the destination specified by the destination information.

7. The on-vehicle apparatus according to claim 1, wherein the the element data comprises at least one of road data, facility data, background data or image data.

8. A transmission method for transmitting data from an on-vehicle apparatus used in a vehicle, the transmission method comprising:

(a) obtaining first map data from a storage part that stores the first map data having a simplified content as compared to second map data, the second map data being displayed on an on-vehicle display, and being used for route guidance;

(b) generating a map image based on the first map data;

(c) when a personal portable electronic device that is a communication partner of the on-vehicle apparatus is in the vehicle, transmitting the map image to a portable electronic device in response to a demand from the portable electronic device through a near field communication part of the on-vehicle apparatus;

(d) generating the first map data based on the second map data; and (e) receiving from the portable electronic device, specification information specifying the attribute of the user of the portable electronic device, wherein the step (d) generates the first map data by changing a part of element data included in the second map data in accordance with the attribute specified by the specification information, the first map data is map data generated by changing a part of element data included in the second map data in accordance with an attribute of a user of the portable electronic device without changing the second map data, a user of the of the on-vehicle apparatus is a driver of the vehicle, and the user of the portable electronic device is a passenger other than the driver of the vehicle.

9. The transmission method according to claim 8, wherein the first map data is map data in which a part of element data included in the second map data is omitted.

10. The transmission method according to claim 8, wherein the first map data is map data in which a font type of text data included in the second map data is changed.

11. The transmission method according to claim 8, wherein the first map data is map data in which a language type of text data included in the second map data is changed.

12. The transmission method according to claim 8, wherein the first map data is map data in which an icon included in the second map data is changed.

13. A non-transitory computer-readable storage medium that stores a program executable by a computer included in an on-vehicle apparatus used in a vehicle, and execution of the program by the computer causes the computer to execute the steps of:

(a) obtaining first map data from a storage part that stores the first map data having a simplified content as compared to second map data, the second map data being displayed on an on-vehicle display and being used for route guidance;

(b) generating a map image based on the first map data;

(c) when a personal portable electronic device that is a communication partner of the on-vehicle apparatus is in the vehicle, transmitting the map image to a portable electronic device in response to a demand from the portable electronic device through a near field communication part of the on-vehicle apparatus;

(d) generating the first map data based on the second map data; and (e) receiving from the portable electronic device, specification information specifying the attribute of the user of the portable electronic device, wherein the step (d) generates the first map data by changing a part of element data included in the second map data in accordance with the attribute specified by the specification information, the first map data is map data generated by changing a part of element data included in the second map data in accordance with an attribute of a user of the portable electronic device without changing the second map data, a user of the of the on-vehicle apparatus is a driver of the vehicle, and the user of the portable electronic device is a passenger other than the driver of the vehicle.

14. The storage medium according to claim 13, wherein the first map data is map data in which a part of element data included in the second map data is omitted.

15. The storage medium according to claim 13, wherein the first map data is map data in which a font type of text data included in the second map data is changed.

16. The storage medium according to claim 13, wherein the first map data is map data in which a language type of text data included in the second map data is changed.

17. The storage medium according to claim 13, wherein the first map data is map data in which an icon included in the second map data is changed.

\* \* \* \* \*